(12) United States Patent
Vajda et al.

(10) Patent No.: US 9,619,301 B2
(45) Date of Patent: Apr. 11, 2017

(54) MULTI-CORE MEMORY MODEL AND SPECULATIVE MODE PROCESSOR MANAGEMENT

(75) Inventors: Andras Vajda, Sundsberg (FI); Per Stenström, Torslanda (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 241 days.

(21) Appl. No.: 14/110,140

(22) PCT Filed: Apr. 5, 2012

(86) PCT No.: PCT/EP2012/056282
§ 371 (c)(1),
(2), (4) Date: Oct. 4, 2013

(87) PCT Pub. No.: WO2012/136766
PCT Pub. Date: Oct. 11, 2012

(65) Prior Publication Data
US 2014/0033217 A1    Jan. 30, 2014

Related U.S. Application Data

(60) Provisional application No. 61/472,268, filed on Apr. 6, 2011, provisional application No. 61/472,874, filed on Apr. 7, 2011.

(51) Int. Cl.
*G06F 9/52* (2006.01)
*G06F 9/38* (2006.01)
*G06F 9/30* (2006.01)

(52) U.S. Cl.
CPC .......... *G06F 9/524* (2013.01); *G06F 9/30076* (2013.01); *G06F 9/30189* (2013.01);
(Continued)

(58) Field of Classification Search
None
See application file for complete search history.

(56) References Cited

U.S. PATENT DOCUMENTS

2005/0223200 A1* 10/2005 Tremblay et al. ............ 712/235
2007/0192540 A1*  8/2007 Gara et al. .................... 711/117
(Continued)

FOREIGN PATENT DOCUMENTS

WO    2006071969 A1    7/2006
WO    2010020828 A1    2/2010

OTHER PUBLICATIONS

Andras Vajda, Per Stenstrom, Semantic information based speculative parallel execution, Jun. 22, 2010, HAL archives—Ouvertes.*
(Continued)

*Primary Examiner* — Lewis A Bullock, Jr.
*Assistant Examiner* — Bruce S Ashley
(74) *Attorney, Agent, or Firm* — Nicholson De Vos Webster & Elliott, LLP (57) ABSTRACT

A method of operating a multi-core processor. In one embodiment, each processor core is provided with its own private cache and the device comprises or has access to a common memory, and the method comprises executing a processing thread on a selected first processor core, and implementing a normal access mode for executing an operation within a processing thread and comprising allocating sole responsibility for writing data to given blocks of said common memory, to respective processor cores. The method further comprises implementing a speculative execution mode switchable to override said normal access mode. This speculative execution mode comprises, upon identification of said operation within said processing thread, transferring responsibility for performing said operation to a plurality of
(Continued)

second processor cores, and optionally performing said operation on the first processor core as well.

9 Claims, 4 Drawing Sheets

(52) U.S. Cl.
CPC .......... G06F 9/3834 (2013.01); G06F 9/3842 (2013.01); G06F 9/528 (2013.01)

(56) References Cited

U.S. PATENT DOCUMENTS

| | | | | |
|---|---|---|---|---|
| 2007/0271445 | A1* | 11/2007 | Tremblay et al. | 712/216 |
| 2008/0282064 | A1* | 11/2008 | Day | G06F 9/5044 712/35 |

OTHER PUBLICATIONS

Martinez, Speculative Synchronization: Applying Thread-Level Speculation to Explicitly Parallel Applications, Oct. 5, 2002, Association for Computer Machinery.*
International Search Report and Written Opinion, Application No. PCT/EP2012/056282, dated Jul. 5, 2012, 8 pages.
International Preliminary Report on Patentability, Application No. PCT/EP2012/056282, dated Oct. 17, 2013, 6 pages.
James R. Goodman, "Using cache memory to reduce processor-memory traffic." In ACM SIGARCH Computer Architecture News, vol. 11, No. 3, pp. 124-131. ACM, 1983.
Randy H. Katz, Susan J. Eggers, David A. Wood, C. L. Perkins, and Robert G. Sheldon. "Implementing a cache consistency protocol." vol. 13, No. 3. pp. 1-31, ACM, 1985.
Mark S. Papamarcos and Janak H. Patel. "A low-overhead coherence solution for multiprocessors with private cache memories." In ACM SIGARCH Computer Architecture News, vol. 12, No. 3, pp. 348-354. ACM, 1984.
Paul Sweazey and Alan Jay Smith. "A class of compatible cache consistency protocols and their support by the IEEE futurebus." In ACM SIGARCH Computer Architecture News, vol. 14, No. 2, pp. 414-423. IEEE Computer Society Press, 1986.
David Chaiken, Craig Fields, Kiyoshi Kurihara, and Anant Agarwal. "Directory-based cache coherence in large-scale multiprocessors." Computer 23, No. 6 (1990): pp. 49-58.
Anoop Gupta, Wolf-Dietrich Weber, and Todd Mowry. "Reducing Memory and Traffic Requirements for Scalable Directory-Based Cache Coherence Schemes." In ICPP (1), pp. 312-321. 1990.
Hakan Nilsson and Per Stenström. "The scalable tree protocol—a cache coherence approach for large-scale multiprocessors." In Parallel and Distributed Processing, 1992. Proceedings of the Fourth IEEE Symposium on, pp. 498-506. IEEE, 1992.
A. Vajda, "Handling of Shared Memory in Many-core systems without Locks and Transactional Memory." In 3rd Workshop on Programmability Issues for Multi-core Computers (MULTIPROG), with HiPEAC 2010. pp. 1-12, 2010.
M. Aater Suleman, Onur Mutlu, Moinuddin K. Qureshi, and Yale N. Patt. "Accelerating critical section execution with asymmetric multi-core architectures." In ACM SIGRACH Computer Architecture News, vol. 37, No. 1, pp. 253-264. ACM, 2009.
András Vajda, "The case for coherence-less distributed cache architecture." Proceedings of the 4th Workshop on Chip Multi-processor Memory Systems and Interconnects. pp. 1-3, 2010.
Andras Vajda, Per Stenstrom. "Semantic information based speculative parallel execution." Wei Liu and Scott Mahlke and Tin-fook Ngai. Pespma 2010—Workshop on Parallel Execution of Sequential Programs on Multi-core Architecture, pp. 1-13, Jun. 2010, Saint Malo, France.
David A. Huffman, "A method for the construction of minimum redundancy codes." Proceedings of the IRE 40.9 (1952): pp. 1098-1101.
Annie Foong, Gary McAlpine, Dave Minturn, Greg Regnier, Vikram Saletore, "An Architecture for Software-Based iSCSI on Multiprocessor Servers," Proceedings of the 19th IEEE International Parallel and Distributed Processing Symposium (IPDPS'05), 2005, pp. 1-7, 213b, doi:10.1109/IPDPS.2005.89.

* cited by examiner

MULTI-CORE MEMORY MODEL AND SPECULATIVE MODE PROCESSOR MANAGEMENT

CROSS-REFERENCE TO RELATED APPLICATIONS

This application is a National stage of International Application No. PCT/EP2012/056282, filed Apr. 5, 2012, which claims priority to U.S. Provisional Application No. 61/472,874, filed Apr. 7, 2011 and U.S. Provisional Application No. 61/472,268, filed Apr. 6, 2011, which are each hereby incorporated by reference in their entirety.

TECHNICAL FIELD

The present invention relates to multi-core processors and their method of operation. In particular, the invention relates to efficient memory access mechanisms for multi-core processors.

BACKGROUND

Figure 1A:
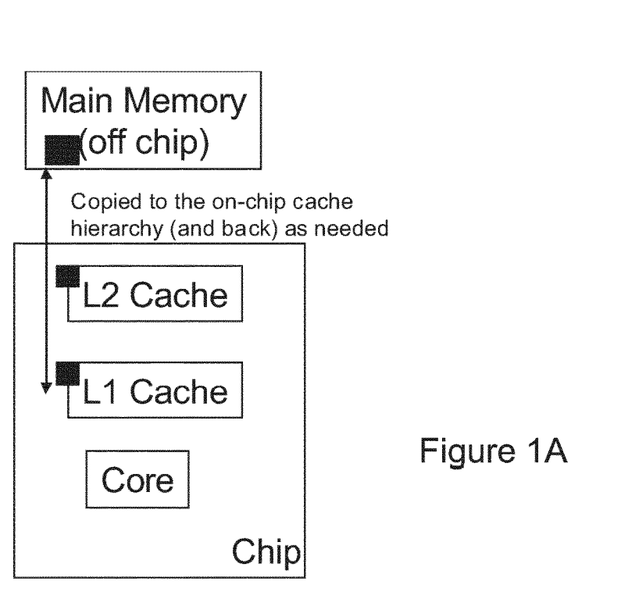
FIG. 1A illustrates schematically a conventional single-core processor architecture.
Figure 1B:
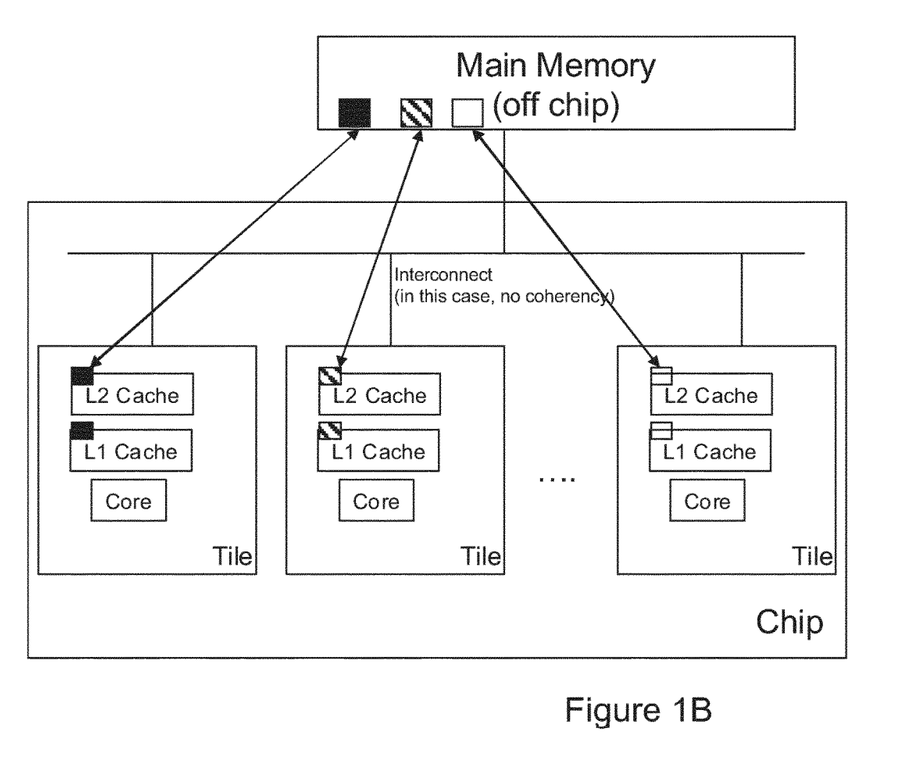
FIG. 1B illustrates schematically a conventional multi-core processor architecture.

A "multi-core processor" is a single computing component comprising a number of independent processors each of which is able to read and execute program instructions. The cores may be integrated onto a single chip, or may be discrete components interconnected together. A multi-core processor allows different or the same sets of instructions to be executed in parallel, significantly increasing processing power as compared to single core processors. Of course, significant challenges are encountered when writing and handling code for use with multi-core processors. FIG. 1A illustrates schematically a single-core processor memory architecture comprising a main memory (off chip) and a single-core on-chip processor with layer 1 (L1) and layer 2 (L2) caches. FIG. 1B illustrates schematically a multi-chip processor architecture again with a (common) off chip main memory.

A particular problem that is encountered with multi-core processors concerns memory access. This is known as the "shared state problem" and arises when individual cores of the system try to access the same data (shared data) from the some location (of a memory) at the some time. If two different cores of the system are allowed to access the same data at the same time, the consistency of that data may be compromised and the system becomes unreliable.

Two approaches to mitigate this shared state problem are (i) using locks and (ii) using hardware or software transactional memory. Locks are resources that may be owned by only one processing instance (processor or thread). If a core acquires "ownership" of a lock, that core is guaranteed exclusive access to the underlying resources (such as data). In the software transactional memory (TM) approach, concurrent access to data by cores is allowed. However, in the event that a conflict arises between first and second accessing cores trying to access the same data at the same time, the first accessing core is stopped and all changes performed by that core are rolled back to a safe state. Thereafter, only the second accessing core is allowed to act on the shared data. After the second accessing core has finished acting on the shared data, the first accessing core is allowed to act on the shared data.

Considering further the lock approach, this may be considered non-composable, i.e., two pieces of otherwise correct program code, when combined, may not perform correctly, resulting in hard-to-detect deadlock or live-lock situations. The transactional memory approach on the other hand, while composable, results in a large processing overhead (usually requiring hardware support). In addition, the transactional memory approach is not scalable, i.e., addition of further cores to an existing system results in lower performance. The multi-core system may become increasingly inefficient as the number of cores trying to access the same data is increased. Furthermore, neither locks nor the TM approach are predictable and deterministic, i.e., it is difficult, and in some cases impossible, to calculate a reliable upper-bound for an execution time required by the accessing cores. This behaviour is not suitable for at least real-time applications.

The literature on cache coherency protocols is significant and includes so-called "snoopy" protocols:

J. R. Goodman, "Using Cache Memory to Reduce Processor-Memory Traffic", *Proc. of the $10^{th}$ International Symposium on Computer Architecture*, pp. 124-131.

R. H. Katz, S. J. Eggers, D. A. Wood, C. L. Perkins, and R. G. Sheldon. Implementing a Cache Consistency Protocol. *Proc. 12'th International Symposium on Computer Architecture*, pp. 276-283.

M. Papamarcos and J. Patel. A Low-Overhead Coherence Solution for Multiprocessors with Private Cache Memories. *Proc. of the 11th International Symposium on Computer Architecture*, pp. 348-354.

P. Sweazey, A. J. Smith. A Class of Compatible Cache Consistency Protocols and their Support by the IEEE Futurebus. *Proc. of $13^{th}$ International Symposium on Computer Architecture.* pp. 414-423.

as well as directory based protocols:

D. Chaiken, C. Fields, K. Kurihara, A. Agarwal: Directory-Based cache Coherence in Large-Scale Multiprocessors. *IEEE Computer* 23(6): 49-58.

A. Gupta, W. D. Weber, T. C. Mowry: Reducing Memory and Traffic Requirements for Scalable Directory-Based Cache Coherence Schemes. *Proc. of ICPP* (1): 312-321.

H. Nilsson and P. Stenström. The Scalable Tree Protocol—A Cache Coherence Approach for Large-Scale Multiprocessors. *Proc. of $4^{th}$ IEEE Symposium on Parallel and Distributed Processing*, pp. 498-507.

These protocols, including commercial solutions, rely on the principle of delivering memory data, required by a specific processor core, to the private cache of that processor core. Existing cache coherence solutions tend to have high complexity and require a significant design and verification effort due to the large number of special cases that need to be taken care of in the presence of truly concurrent access to the memory and presence of the same memory blocks in multiple caches in the memory hierarchy. Another drawback of cache coherence is that it moves the data to the computation which can potentially cause significant inefficiencies.

In contrast to these known protocols, more recent work [see for Vajda, A. Handling of Shared Memory in Many-core systems without Locks and Transactional Memory. $3^{rd}$ Workshop on Programmability Issues for Multi-core Computers (MULTIPROG), and Suleman, M. A., Mutlu, O., Qureshi, M. K., Patt, Y. N. Accelerating Critical Section Execution with Asymmetric Multi-Core Architectures. In International Conference on Architectural Support for Programming Languages and Operating Systems] take a different approach, employing the principle of moving the computation to the data. The solution proposed by Suleman et al relies on concentrating all access to shared memory in one single, powerful core, while that proposed by Vajda proposes a generalized solution, based on software driven allocation of memory blocks to processor cores. In a further paper [Vajda A. The Case for Coherence-less Distributed Cache Architecture. 4*th* Workshop on Chip Multiprocessor Memory Systems and Interconnects] a preliminary analysis is offered on the impact that such solutions can have on chip architectures and memory models.

WO2010/020828 describes a method and architecture for sharing data in a multi-core processor architecture. Foong. A et al, An Architecture for Software-based iSCSI on Multi-processor Servers describes the use of a software implementation of iSCSI in the context of chip multiprocessing (CMP).

SUMMARY

It is an object of the present invention to further optimise the known solutions to the shared state problem. This is achieved by implementing a normal mode in which access to shared memory is concentrated in a single core, but allowing that mode to be replaced by a speculative execution mode under certain circumstances.

According to a first aspect of the present invention there is provided a method of operating a multi-core processor, where each processor core is provided with its own private cache and the device comprises or has access to a common memory.

The method comprises executing a processing thread on a selected first processor core. The method further comprises implementing a normal access mode for executing an operation within said processing thread and comprising allocating sole responsibility for writing data to given blocks of said common memory, to respective processor cores. The method further comprises implementing a speculative execution mode switchable to override said normal access mode.

This speculative execution mode comprises, upon identification of an operation within said processing thread, transferring responsibility for performing said operation to a plurality of second processor cores, and optionally performing said operation on the first processor core as well. This includes copying data from a given block of said common memory to the private cache of each of said second processors and optionally said first processor. Each of said second processors and optionally said first processor is allowed to modify the data in its own private cache without making the changes visible to other processors.

Upon completion of said operation at the second processor cores and optionally said first processor core, sole responsibility for writing data to said given block of said common memory is temporarily allocated to one of said second processor cores, or optionally to said first processor core if said operation has been performed on said first processor core, whichever one is deemed to have successfully performed said operation, and execution of said processing thread at said first processor core is resumed.

Considering further the normal access mode, this may comprises the step of identifying within said processing thread an operation that will or may result in the writing of data to a block of said common memory for which a second processor core is responsible. Execution of the processing thread on the first processor core is suspended and responsibility for performing said operation transferred to said second processor core. This includes copying data between the memory block allocated to the second processor core and the private cache of that second processor core. Upon completion of said operation at said second processor core, execution of said processing thread is resumed at said first processor core.

Embodiments of the invention enable the normal mode to be employed when speculative execution is not required. The advantages of the normal mode, discussed above, can be obtained in this case. However, when speculative execution is required, the normal mode can be suspended to allow any one of the operating multi-cores to access the appropriate block(s) in the common memory.

Considering possible embodiments of the invention, the second cores, and optionally said first core, may perform said operation under respective, different sets of assumptions with the successful core being chosen based upon a determination of a correct set of assumptions. The steps of transferring responsibility for performing said operation may comprise, for the or each second processor core, adding said operation to a task queue for the second processor core, the second processor core executing the queued operations in order. Upon completion of said operation at a second processor, the second processor may return an operation completion message to said first processor.

The step of identifying within the processing thread an operation that will or may result in the writing of data to a block of said common memory for which a second processor core is responsible, may comprise identifying within compiled code an explicit instruction identifying a block or set of blocks of said common memory.

A switch from said normal mode to said speculative mode may be triggered by identification of an explicit instruction within compiled code to switch to said speculative mode. The method may comprise identifying within compiled code a number of processor cores on which said operation is to be performed, and performing the operation on that identified number of cores. In the speculative mode of operation, the successful core may be determined on the basis of a criterion or criteria identified in the compiled code.

According to a second aspect of the present invention there is provided a multi-core processor, where each processor core is provided with its own private cache and the device comprises or has access to a common memory. The processor is configured to execute a processing thread on a selected first processor core, and to implement a normal common memory access mode for executing an operation within a processing thread and comprising allocating sole responsibility for writing data to given blocks of said common memory, to respective processor cores.

The processor is further configured to implement a speculative execution mode switchable to override said normal access mode. The speculative execution mode comprises, upon identification of said operation within said processing thread, transferring responsibility for performing said operation to a plurality of second processor cores, and optionally performing said operation on the first processor core as well, including copying data from a given block of said common memory to the private cache of each of said second processors and optionally said first processor. Each of said second processors and optionally said first processor is allowed to modify the data in its own private cache without making the changes visible to other processors.

Upon completion of said operation at the second processor cores and optionally said first processor core, sole responsibility for writing data to said given block of said common memory is temporarily allocated to one of said second processor cores, or optionally to said first processor core if said operation has been performed on said first processor core, whichever one is deemed to have successfully performed said operation, and execution of said processing thread at said first processor core is resumed.

DETAILED DESCRIPTION

Considering further the known approaches to solving the shared state problem, solutions which involves moving the computation to the data (e.g. WO2010/020828) show a great deal of promise. However, the solutions do not allow for the so-called "speculative" execution of an operation. A speculative execution typically involves executing the same code in parallel on two or more cores of a multi-core processor, each execution relying upon different data, e.g. conditions. A speculative execution may be initiated, for example, by a primary core (executing the main processing thread) prior to a data result being computed or received by the primary core. Each secondary core is provided with the operation code and possible data result. Once the data result is known to the primary core, that core can select the appropriate secondary core operating on that result, i.e. the "winning" core. The secondary core may by that time have completed its task or will at least have begun its execution. At this point, ongoing execution of the task by any other secondary cores may be aborted.

A new memory model and cache architecture will now be described. This architecture can simultaneously support a shared memory model as well as software driven speculative execution, without the overhead generally associated with traditional cache coherence protocols. It is expected that the architecture will provide enhanced cache re-use efficiency and hence improved memory bandwidth.

The architecture presented here builds upon the architecture of WO2010/020828 by introducing a new memory and cache hierarchy and consistency model that relies heavily on input from software to simplify the cache architecture, improve cache usage efficiency (and, implicitly, memory bandwidth utilization) and provide support for additional mechanisms including software-driven coarse grain speculative execution. The new mechanisms that are described also provide simple architectural support for hybrid software-hardware implementation of transactional memory. The proposed architecture makes use of the following features:

Each core has a certain amount of private cache. These private caches may have different sizes for different cores.

No coherence protocol is used between these private caches. Rather, each and every memory block within a main memory is mapped to one and only one core. The private cache to which a memory block is mapped is referred to as that core's "home cache". As a result, in a "normal mode" of operation, a memory block is only accessible by the core which owns it.

Access to the main memory can happen in two modes, namely:

Normal access mode: relevant content of the main memory is cached in a particular home cache and the execution thread needing access to it will have to be executed on the core owning the cache. This is for example as described in WO2010/020828.

Speculative access mode: the relevant content of the main memory is cached and written to multiple private caches. However, once the updates to the cached copies are completed, only one (or none) of the modified versions is written back to the main memory.

According to the approach presented here, there is no communication between the private caches when an operation is being worked on in the normal access mode. Rather, the flow of execution is moved. Such communication will only occur when a special access mode—herein called speculative access mode—is activated, in which case the strict rule of single point of access is relaxed. However, only one of the concurrent access (or none) will eventually be committed. This special case can be used for example for speculative execution.

A tile-based chip organization architecture is assumed (as illustrated in FIG. 1B), where each tile acts independently as a single uni-processor system. Each tile consists of a processor core that has its own private cache hierarchy, consisting of private data and code L1 caches and a private L2 cache that is not shared with any other tile and does not participate in any cache coherence mechanism. The cache hierarchy of each tile is in fact designed as in a single core chip's case, for bridging the speed of the core and the speed of the memory and there's no coherency mechanism available between the different caches.

The interconnect architecture between the tiles is orthogonal to the design of the memory system: there is a need to have a communication mechanism between tiles, but the actual design of it is not relevant as long as it provides a reliable medium for transferring messages between the tiles and allows each tile's cache controller to access the main memory. Thus, a first principle of the proposed architecture is that caches are distributed and each core's private cache is organized as a single-core machine's cache, acting as a bridge between the memory's access speed and the speed of the processor.

Clearly, shared memory semantics in such a system require the implementation of more features: with no coherence mechanisms between core-private caches it would be impossible to provide a consistent view of the memory. The approach presented here is based on the observation that no matter how efficient the cache coherence mechanisms, in order to provide correct semantics on the program level with shared memory access, it is necessary in addition to implement support for mutual exclusion. In a correctly written shared memory program, thread communication can only happen inside critical sections or atomic blocks; if shared data is accessed outside critical sections, there is no communication between threads. Hence, there are no data races and there is no need for a cache coherence mechanism. This in practice will lead to serial execution of accesses to shared memory blocks by different threads. Usually mutual exclusion is implemented through software mechanisms such as locks, mutexes or semaphores (that generally rely on hardware support for atomic test-and-set or similar instructions). Therefore, cache coherence is replaced with a combined hardware-software solution for mutual exclusion that can provide at the software level—but not at the hardware level—the semantics of shared memory, with the added value of built-in mechanisms for safe and semantically correct mutual exclusion.

There are two principles on which this solution is built. The first is the explicit marking at the source code level of the code chunks that access shared memory areas; the second one is the implementation of the principle of moving the computation to the data, rather than replicating the data.

Marking at the source code level is the basic mechanism that a programmer shall use to convey—to the compiler and the hardware—information about accesses to shared memory in terms of location in the code and accessed memory blocks. These marked blocks are referred to here as "transactions" (as the semantics and the marking itself are very similar to the definition of transactions: the complete code block will either be executed fully or will be rolled back and re-executed at a later time). The beginning of the code segment that accesses one or several shared memory blocks is marked with "BEGIN TRANSACTION", while the end of it is marked with "END TRANSACTION". In addition, the marking includes the list of shared memory blocks that will be accessed within the transaction. To distinguish over transactions used to model speculative execution, these transactions are termed "sharing transactions".

This marking of the code allows the compiler to map out dependencies between transactions as well as proper placement—home location—of shared memory blocks across available hardware. The computation can then be moved to the data.

The detailed mechanisms to perform this mapping and detect potential deadlocks are described in Vajda, A. Handling of Shared Memory in Many-core systems without Locks and Transactional Memory. $3^{rd}$ Workshop on Programmability Issues for Multi-core Computers (MULTIPROG). Here, only a brief description of the overall architecture is provided.

Transactions are grouped by the compiler into "transaction groups". Group membership is defined by a simple rule: a transaction belongs to a group if and only if it accesses at least one shared memory block accessed by at least one other transaction in the group. In fact, transaction groups represent dependencies between transactions in terms of the shared memory blocks that are accessed. Each transaction group is assigned a processor core—the "resource guardian" or home location—on which all the transactions in the transaction group will be executed. Implicitly, this core is also the home location of all of the shared memory blocks accessed by transactions in the transaction group, in the sense that all accesses to that memory block will happen on this core (physically the memory block may still be allocated anywhere in the memory). One core can be home to multiple transaction groups, but the distribution of a transaction group across multiple cores has a number of issues that are not trivial to address.

This mechanism turns the resource guardian cores into a special implementation of the lock concept: the execution of the transactions in the associated transaction group must be "serialized" in order to enforce mutual exclusion of the execution and this is precisely what is being achieved by assigning transaction groups to dedicated processor cores. The resource guardian cores will implement a local queue of transactions that will be used to store transactions that have to wait for previously issued transactions to complete. Such partitioning and moving of the computations to where the data is located also results in a memory consistency model that can guarantee global ordering of reads and writes.

Nested transactions may lead to dead-lock situations, i.e. in the case that a nested transaction has to execute on another core. Suspending the current resource guardian core and off-loading execution to another core can lead to a circular dependency between resource guardians, i.e., a dead-lock situation. In Vajda, A. Handling of Shared Memory in Many-core systems without Locks and Transactional Memory. $3^{rd}$ Workshop on Programmability Issues for Multi-core Computers (MULTIPROG), a method is described for detecting such a deadlock and for removing it through a rollback mechanism. In that paper, some form of transactional memory was proposed as the solution for rollback; here, a new method based on the usage of the L2 cache will be elaborated upon.

In conclusion, as shared read/write data is only accessed inside sharing transactions and these are executed on a single core, there is no need for cache coherence mechanisms. Any shared read/write memory block can at any given time be present in only one tile's cache. The same memory block is permitted to be present in multiple caches if and only if it is accessed for reading only by all cores, all of the time.

As described in Vajda A. The Case for Coherence-less Distributed Cache Architecture. $4^{th}$ Workshop on Chip Multiprocessor Memory Systems and Interconnects, this solution provides interesting opportunities for further improving the accuracy of cache accesses and pre-fetching. On resource guardian cores the transactions waiting to be executed will be placed in a wait queue that deterministically defines the order in which these will be executed. By inspecting this queue and knowing for each transaction the memory blocks it will access, the code of the transaction as well as the memory blocks can be pre-fetched with a guaranteed success rate. This way, assuming a sufficiently large L2 cache, a zero miss rate performance can be achieved, both for code and data. Also, as it is known what data is accessed and when that data is accessed, it is possible to allow multiple transactions to execute partially in parallel if the home core is a multi-threaded engine.

Thread level, coarse grained speculative execution, augmented with semantic information provided by the programmer, has recently been proposed as a solution to improve the performance of sequential applications on multi-core and many-core architectures [Vajda A. Stenström P. Semantic Information based Speculative Parallel Execution. Proc. $3^{rd}$ Workshop on Parallel Execution of Sequential Programs on Multi-Core Architecture]. A mechanism that can complement the approach described in the previous section (normal mode) to provide support for spawning, squashing and committing speculative threads of execution will now be considered.

Figure 3:
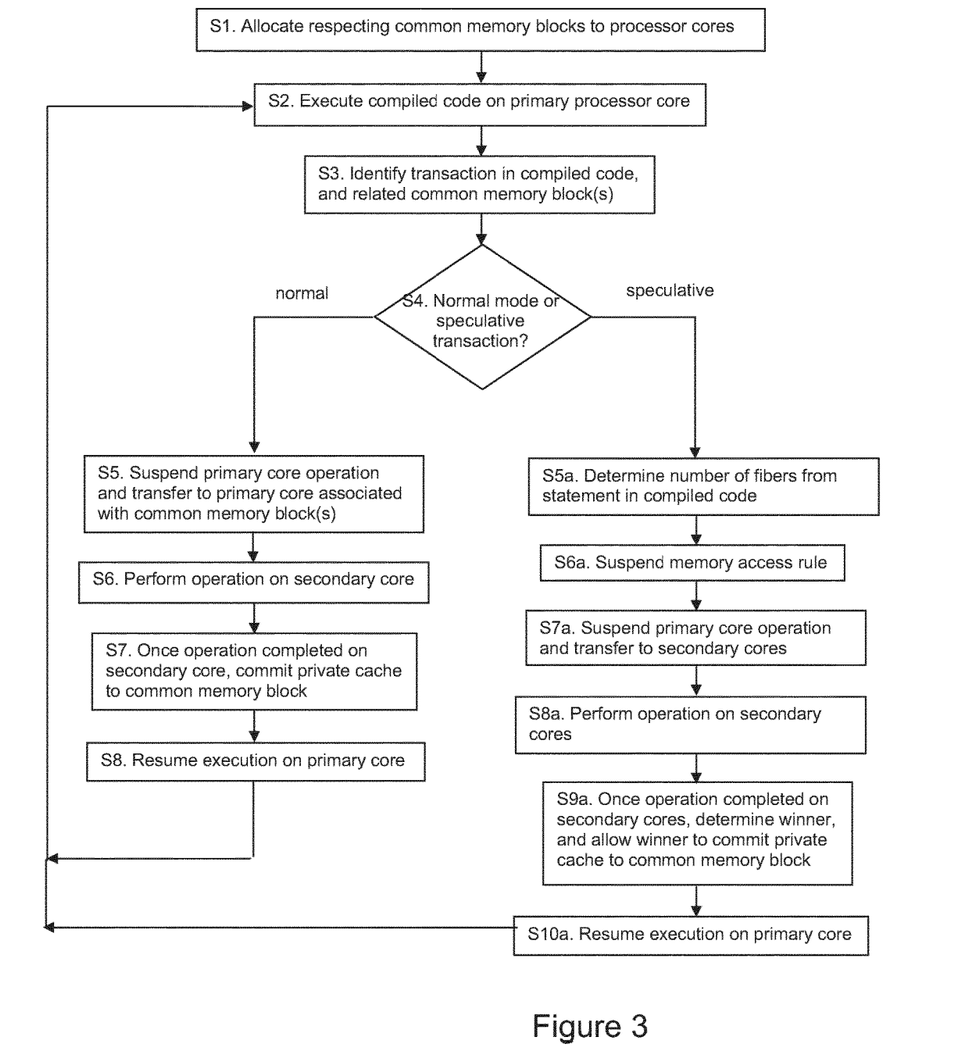
FIG. 3 is a flow diagram showing a multi-core processor operation process including both a normal and a speculative operating mode.

It is proposed to relax the strict rules on when a memory block can be present in the cache of—and be modified by—multiple cores. The process is illustrated very generally in FIG. 3. Transactions specifically marked in the operation code as "speculative" will be executed in parallel on multiple cores (one such execution thread is referred to here as a "speculative fiber"), and these multiple cores are allowed to hold private copies of the some memory block in their private caches. However, this relaxation comes with two additional constraints:

The modified versions of the memory blocks (held in the private caches) are not committed back to the main memory, i.e., are not made visible to other cores, before the execution of all speculative fibers spawned on behalf of the speculative transactions are concluded and the selection of the correct variant is performed.

At the end of the execution of the speculative fibers, one speculative fiber is selected as the winner; its modified version of the shared memory block is committed (made visible to other cores), while all the other speculative fibers will be "squashed". It is possible that no fiber is selected as the winner, in which case the complete speculative execution is discarded The software is in charge of deciding which speculative fiber to select as winner and the decision is communicated to the hardware, for example using a special instruction.

It is important to note the difference between the concept of the speculative fiber presented here and what traditionally is called a "speculative thread". A speculative fiber is essentially a thread created at the request of the programmer—or based on programmer provided hints—that will execute an arbitrary part of the program speculatively, assuming that certain conditions (such as values of memory locations) will be met. The result of the complete execution is kept invisible until it can be decided—either by the hardware or explicitly by the programmer—whether the assumed conditions were met. A concrete application of the concept of speculative fibers is described in Vajda A, Stenström P. Semantic Information based Speculative Parallel Execution. Proc. $3^{rd}$ Workshop on Parallel Execution of Sequential Programs on Multi-Core Architecture, where it is successfully applied to speeding up Huffman decompression.

In order to make speculation meaningful, the different speculative fibers will have to start with different, fiber-specific assumptions: e.g., assume that a branch is taken or not, assume a certain value stored somewhere in the memory etc. A concrete mechanism for managing this specificity is now presented.

Mechanisms for designing a cache system that can support shared memory semantics that is safe at the program level have been described. These guarantee proper, semantically correct ordering of larger transactions which can also provide support for coarse grained, software-controlled speculative execution. We achieve this by removing cache coherency support in hardware and replace it with software-controlled decisions on where to cache data, where to execute specific parts of the code and which speculative fibers shall be kept.

The main mechanism proposed for the programmer is the concept of "transactions". A transaction is characterized by the following features:

The code it shall execute;

The memory blocks it will access that may be accessed by other transactions concurrently;

A type: a sharing transaction has to be executed in mutual exclusion with regards to other transactions acting on at least one of its shared memory blocks, while a speculative transaction will be executed over multiple cores simultaneously, but only one of the executions (or none) will be retained, all others being squashed.

From the programmer's perspective, the fundamental concept is that of a transaction. The transaction is used in two contexts: for accessing shared memory and for performing speculative execution of parts of a program. For speculative transactions, the following aspects are important:

There shall be a mechanism to define the total number of desired fibers for the transaction.

Each speculative fiber has to execute within a different context from the other fibers, such as different value assumptions. To set the context up, a mechanism needs to be provided for the programmer to define the variations specific to each fiber.

At the end of the execution of all speculative fibers, a winner fiber needs to be selected.

In order to cater for these additions, the "BEGIN TRANSACTION" statement is enhanced with an extra parameter "FIBERS=n", that indicates the number of desired fibers. In addition, a "PRELUDE" code segment can be defined by the programmer to set the context for the fiber's execution; in this segment a special variable—"_fiber"—can be accessed that gives the index of the fiber that can be used to decide on the fiber specific adaptations. To select the winner fiber, a special code segment—marked with "ELECTION"—shall be provided by the programmer to choose which fiber's result—if any—will be retained. This code segment shall set the value of the "_fiber" special variable to the winning fiber's identity (or an undefined value, if there is no winner). As such, the definition of a speculative fiber might be as follows:

BEGIN TRANSACTION FIBERS=16 <list of memory blocks>
PRELUDE
<modify some memory based on the value of _fiber>
END
<actual code that is executed speculatively>
ELECTION
<decide which speculative fiber shall be kept by setting the value of _fiber accordingly>
END
END TRANSACTION In the proposed model, memory blocks can be in one of the following states:

Idle: the memory block is not in use.

Private: the memory block is allocated and accessed by one single thread.

Read-shared: the memory block is allocated, but it is read-only.

Write-shared: the memory block is allocated and it is accessed both for reading and writing.

Speculative: the memory block is accessed as part of an ongoing speculative execution.

Figure 2:
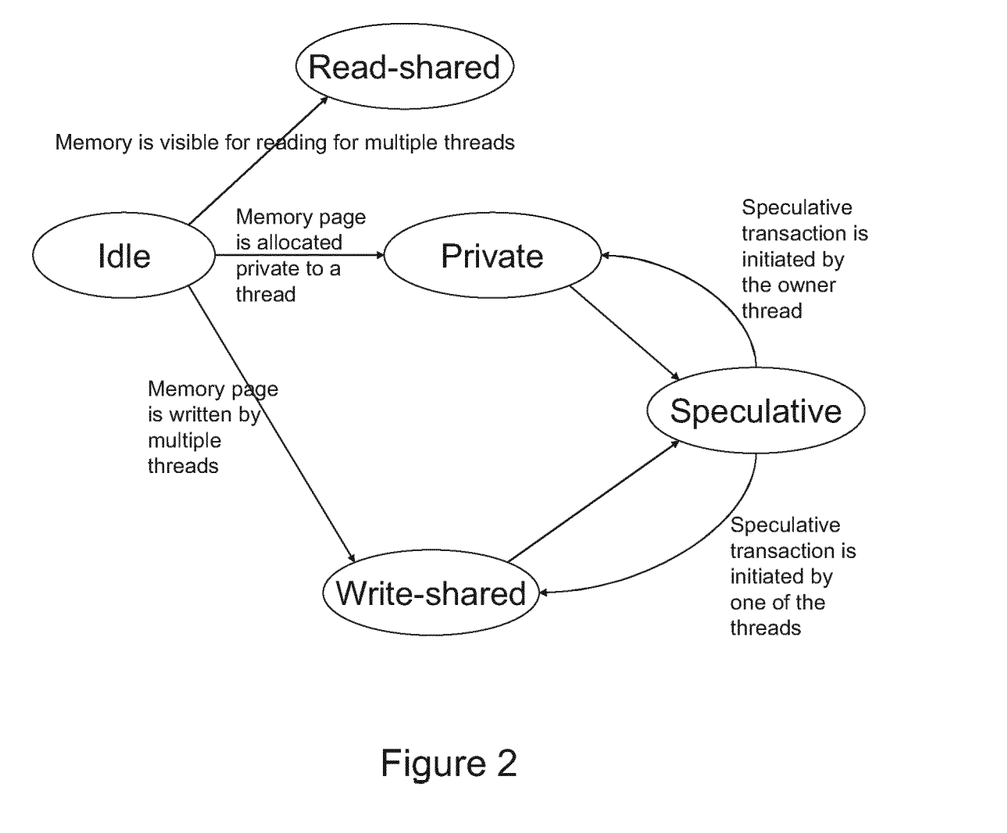
FIG. 2 illustrates a state transition diagram for memory blocks according to an improved multi-core processor architecture.

FIG. 2 illustrates the state transition diagram for memory blocks. A Private memory block will always be cached in the private cache of the tile on which the thread to which it belongs is executed; a Read-shared block can be cached on any tile that accesses it. For Write-shared, the new mechanism will be applied: it will be cached only on its resource guardian and the execution of the threads accessing it will always be moved to the resource guardian.

The Speculative state is a transient state applicable during speculative execution of a transaction or operation. Both Private and Write-shared memory blocks can transition into this state, in case the processing thread that is the owner of the memory block (for Private memory blocks), or one of the processing threads having access to the Write-shared memory block, enters a speculative transaction. In the case of Write-shared memory blocks, the execution of the thread is moved to the resource guardian where it will only be executed once all the other transactions preceding it have been executed.

From this point on, the execution of speculative transactions accessing both private and write-shared memory blocks will be handled the same way. A number of cores—if possible, equal to the value specified in the FIBERS statement—will be designated for executing the speculative transaction and all memory blocks listed for the transaction will be marked as Speculative. During the execution of the transaction, all memory blocks marked as speculative will be cached locally on each tile executing a speculative fiber. When the winning fiber is selected, the tile corresponding to the winning fiber will write back the content of Speculative blocks; all other tiles will clear their caches without write-back. The states of the blocks involved are reset to their original state (Private or Write-shared) and normal execution is resumed.

A similar mechanism—caching in L2 and write-back only after successful completion—can be applied for resolving dead-lock situations as well for the sharing of transactions. This method assumes that the L2 cache on each tile is large enough to hold all the blocks accessed in any speculative or sharing transaction. This may be too prohibitive a restriction; using special write-back memory areas, this limitation can be removed with a limited overhead.

In order to achieve the behavior described above, there is a need for a continuous interaction between the core and the cache controller on each core. On a normal core (non-transactional, non-resource guardian core), the cache controller acts exactly as in a single processor system. On a resource guardian core, the core can steer the pre-fetching process of the cache controller based on the content of its queue of transactions to be executed: the cache controller, if possible, can pre-fetch the code and data needed for the next transaction while the current one is still executing. Also, in order to guarantee that rollbacks can be executed safely, after each transaction that is successfully executed, the content of the cache has to be flushed back to the main memory.

Figure 4:
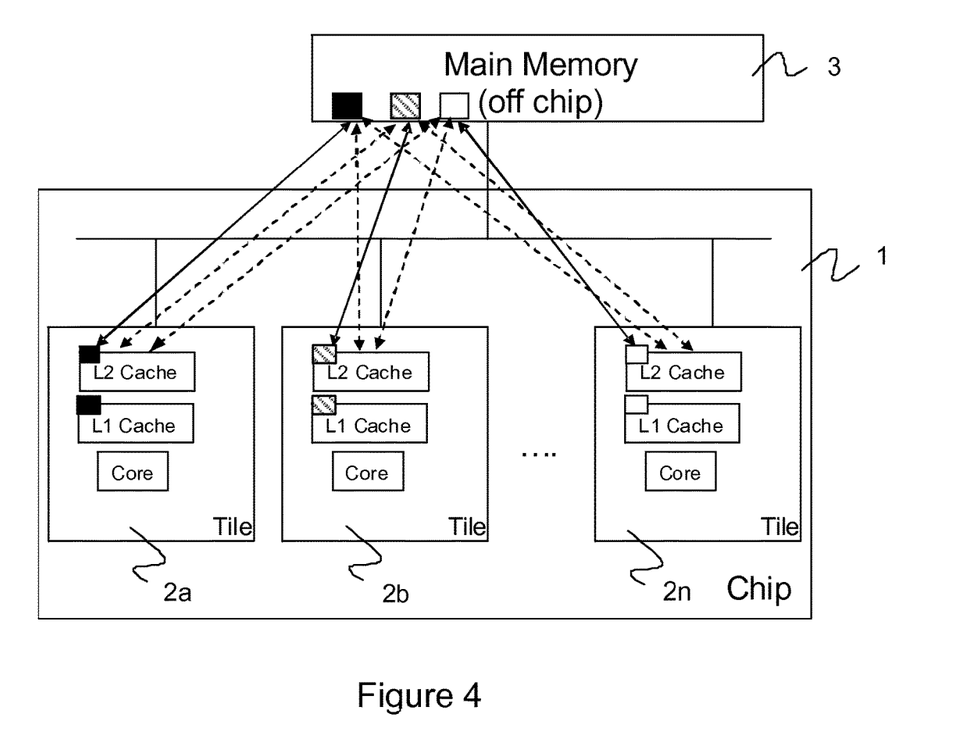
FIG. 4 illustrates schematically a processor architecture for implementing the process of FIG. 3.

During speculative execution, the core will essentially take over complete control of the cache: write-back or discarding of the cache's content is decided in software and passed down to the cache controller; for all memory blocks marked as Speculative, the cache controller only performs loading of the cache: all other decisions are software-driven. FIG. 4 illustrates schematically the multi-core processor comprising a plurality of cores 2 each having private caches L1, L2. The processor has access to a common memory 3. The solid lines coupling the private caches and the common memory blocks indicate the home cache relationships when the processor is operated in the normal mode. The dashed lines indicate that, in the speculative mode, any of the caches (at least any of those involved in the speculative mode execution) may access any of the blocks in the common memory dependent of course upon access being restricted to the "winning" cache.

The speculative mode of execution can also be used to implement transactional memory semantics. In fact, transactional memory can be modeled as a special case of speculative execution, with some small modifications:

Different fibers may execute different transactions—it's not required that the same transaction is executed by all fibers The system needs to keep track of all changes to blocks marked as Speculative With these changes, transactional memory can be implemented as follows:

When a transaction is entered, the memory blocks it accesses are marked as Speculative and the transaction is executed as a speculative fiber, on one core; if the memory blocks are already marked Speculative, there may be other ongoing transactions.

At the end of the transaction, the ELECTION section will check if any of the blocks were modified elsewhere; if not, the transaction is committed, otherwise it is rolled bock.

This method will seek to ensure that at least one transaction—the last one to complete—will make progress, as all the previous ones have probably rolled back due to the detection of a conflict.

Many applications are suspected to be inherently sequential, in the sense that no known parallel algorithm exists that can generate the result faster than on a single core machine. Prior work has shown however that coarse grain, software driven speculation, enhanced with semantic information provided by the programmer, can significantly improve the execution speed on multiple machines, without the need to significantly modify the code.

Software controlled speculative execution has been successfully applied to several applications considered hard to parallelize, such as Huffman decoding, Dijkstra's algorithm or the cjpeg (compressed jpeg) EEMBC (Embedded Microprocessor Benchmark Consortium) benchmark. These applications are characterized by the fact the compiler and run-time system alone cannot decide if and how portions of the code can be parallelized; however, the programmer can provide hints that enable speculative pre-execution of a limited set of alternatives, with the correct one being chosen at a later stage.

Considering further the example of Huffman coding [Huffman, D., A method for the construction of minimum redundancy codes. In *Proc. IRE*, vol. 40], this process is a lossless compression algorithm, relying on building a binary tree where leaves represent symbols from the data that is being compressed; each symbol is assigned a code based on the path to the corresponding leaf, from the root. The algorithm relies on assigning shorter codes for more frequent symbols. Decoding of Huffman-encoded streams is considered hard to parallelize. Indeed, it is impossible to split up the compressed stream into chunks, as there are no reliable ways to detect where a new code section starts. The key insight however is that it is possible to identify—by analyzing the code tree—the number of consecutive bits which, with a certain probability, will contain a code boundary. By exploiting this knowledge, a number of speculative fibers can be initiated that start decoding the stream each at one of these consecutive bits. One of these will be successful with a given probability, all others will be squashed.

Good use can be made of the memory model proposed here for managing the output buffer of each speculative fiber: each of the fibers can execute Huffman decoding within a speculative transaction and safely write into the main output buffer; our proposed mechanism will make sure that these writes are kept local to the core which executes the speculative fiber. When it has been decided which speculative execution is successful, the local copies of all the other cores will simply be discarded and the "winner" core will commit the changes back to the main memory. Relying on this underlying mechanism enables the impact on the source code to be minimal: the call to the decompression function is simply marked as a speculative transaction; all other "housekeeping" can be taken care of by the underlying run-time system.

The memory model for software controlled speculative execution on a 64 core TilePro processor from Tilera has been simulated. Using 57 cores (the other cores were reserved for system usage), a speed increase of 7.9 has been measured for the Huffman decoding algorithm, compared to execution on a single core. The overhead associated with implementing the memory model, even though it was done purely in software, remained at around 1%, which suggests that an efficient hardware implementation can be designed. It is important to stress that this performance boost was possible to achieve without actually rewriting the sequential version of the algorithm: simple code annotations and the underlying support for speculative transactions were sufficient.

The approach described here can provide safe shared memory support, transactional memory semantics and support for software driven speculative execution in one integrated solution. The approach involves: for shared memory applications, sharing on hardware level is restricted and software driven migration of computation relied upon. For sequential, single threaded code executed speculatively on the other hand, multiple cached versions of the some memory areas is allowed, augmented with software controlled selection of a winning version as the basis for maintaining consistency. A key insight that is promoted is that hardware-only solutions—even augmented with compiler support—are not sufficient. However, just simple "hints" provided by the software—in the form of sharing or speculative transactions—can have a dramatic impact on how efficiently the hardware can execute a given piece of software.

This approach may be developed by exploring how multi-threaded cores can be exploited to improve the parallelism in, for example, execution on resource guardian cores.

The invention claimed is:

1. A method of operating a multi-core processor, where each processor core is provided with its own private cache and access to a common memory, the method comprising:
    executing a processing thread on a selected first processor core for executing a compiled code that was generated from source code, wherein the source code comprises an explicit indication of an amount of second processor cores to process an operation, wherein the processing thread operates in a normal access mode and in a speculative execution mode switchable to override said normal access mode, wherein the processing thread, when in the normal access mode, performs the steps of:
    allocating sole responsibility for writing data to given blocks of said common memory to respective processor cores;
    identifying an explicit instruction within the compiled code to switch to said speculative execution mode for executing the operation;
    based on the identification of the explicit instruction, triggering a switch from said normal access mode to said speculative execution mode;
    after switching to speculative execution mode:
        identifying the amount of the second processor cores to execute the operation as indicated by the explicit instruction within the compiled code;
        transferring responsibility for performing said operation to the identified amount of second processor cores, including copying data from a given block of said common memory to the private cache of each of said second processor cores, wherein each of said second processor cores is allowed to modify the data in its own private cache without making changes visible to other processor cores;
        determining which of the second processor successfully performed said operation based upon a criterion specified in the compiled code derived from an election code segment of the source code;
        upon completion of said operation at the second processor cores, temporarily allocating sole responsibility for writing data to said given block of said common memory to the one of said second processor cores deemed to have successfully performed said operation;
    triggering a switch from said speculative execution mode to said normal access mode; and
    resuming execution of said processing thread at said first processor core in said normal access mode.

2. The method according to claim 1, further comprising:
    identifying within said processing thread another operation where data is writable to a block of said common memory for which a second processor core is responsible;
    suspending execution of the processing thread on the first processor core and transferring responsibility for performing said another operation to said second processor core including copying data between the memory block allocated to the second processor core and the private cache of that second processor core; and
    upon completion of said another operation at said second processor core, resuming execution of said processing thread at said first processor core.

3. The method according to claim 2, wherein said identifying within said processing thread the another operation where data is writable to the block of said common memory for which the second processor core is responsible, comprises identifying within the compiled code an explicit instruction identifying the block of said common memory.

4. The method according to claim 1, wherein different ones of said second processor cores perform said operation under respective, different sets of assumptions and the successful processor core is chosen based upon a determination of a correct set of assumptions.

5. The method according to claim 1, wherein said transferring responsibility for performing said operation comprises, for each second processor core, adding said operation to a task queue for the second processor core, the second processor core executing the queued operations in order.

6. The method according to claim 1, further comprising, upon completion of said operation at one of the second processor cores, causing the one of the second processor cores to return an operation completion message to said first processor core.

7. The method according to claim 1, wherein the speculative execution mode further comprises:
    upon identification of the operation within said processing thread, performing said operation on the first processor core as well, including also copying data from the given block of said common memory to the private cache of said first processor core, wherein said first processor core is also allowed to modify the data in its own private cache without making the changes visible to other processor cores.

8. A multi-core processor, where each processor core is provided with its own private cache and access to a common memory, the multi-core processor being configured to:
    execute a processing thread on a selected first processor core for executing a compiled code that was generated from source code, wherein the source code comprises an explicit indication of an amount of second processor cores to process an operation, wherein the processing thread operates in a normal access mode and in a speculative execution mode switchable to override said normal access mode, wherein the processing thread, when in the normal access mode, is to perform the steps of:
allocating sole responsibility for writing data to given blocks of said common memory to respective processor cores;
identifying an explicit instruction within the compiled code to switch to said speculative execution mode to execute an operation;
based on the identification of the explicit instruction, triggering a switch from said normal access mode to said speculative execution mode;
upon switching to speculative execution mode:
  identifying the amount of the second processor cores to execute the operation as indicated by the explicit instruction within the compiled code;
  transferring responsibility for performing said operation to the identified amount of second processor cores, including copying data from a given block of said common memory to the private cache of each of said second processor cores, wherein each of said second processor cores is allowed to modify the data in its own private cache without making changes visible to other processor cores;
  determining which of the of second processor cores successfully performed the operation based upon a criterion specified in compiled code derived from an election code segment of the source code;
  upon completion of said operation at the second processor cores, temporarily allocating sole responsibility for writing data to said given block of said common memory to the one of said second processor cores deemed to have successfully performed said operation;
  triggering a switch from said speculative execution mode to said normal access mode; and
  resuming execution of said processing thread at said first processor core in said normal access mode.

9. The multi-core processor according to claim 8, wherein said multi-core processor is further configured, when operating in said speculative execution mode, to identify within said processing thread another operation where data is writable to a block of said common memory for which a second processor core is responsible by identifying within compiled code an explicit instruction identifying a block or set of blocks of said common memory.

* * * * *